US009185134B1

(12) United States Patent
Story, Jr. et al.

(10) Patent No.: US 9,185,134 B1
(45) Date of Patent: Nov. 10, 2015

(54) ARCHITECTURE FOR MODERATING SHARED CONTENT CONSUMPTION

(71) Applicants: Guy A. Story, Jr., New York, NY (US); Ajay Arora, New York, NY (US); Steven D. Hatch, Maplewood, NJ (US)

(72) Inventors: Guy A. Story, Jr., New York, NY (US); Ajay Arora, New York, NY (US); Steven D. Hatch, Maplewood, NJ (US)

(73) Assignee: Audible, Inc., Newark, NJ (US)

( * ) Notice: Subject to any disclaimer, the term of this patent is extended or adjusted under 35 U.S.C. 154(b) by 121 days.

(21) Appl. No.: 13/621,763

(22) Filed: Sep. 17, 2012

(51) Int. Cl.
*G06F 17/00* (2006.01)
*H04L 29/06* (2006.01)
*G06F 21/62* (2013.01)

(52) U.S. Cl.
CPC ............ *H04L 63/20* (2013.01); *G06F 21/6218* (2013.01); *H04L 63/102* (2013.01)

(58) Field of Classification Search
CPC .... H04L 63/20; H04L 63/102; G06F 21/6218
USPC .............. 726/1, 2–8; 713/168–174, 182–186, 713/202; 709/206, 225, 229, 249, 389
See application file for complete search history.

(56) References Cited

U.S. PATENT DOCUMENTS

| 2009/0055538 | A1* | 2/2009 | Conradt et al. ............... 709/227 |
| 2009/0222520 | A1* | 9/2009 | Sloo et al. ..................... 709/205 |
| 2012/0150997 | A1* | 6/2012 | McClements, IV .......... 709/217 |
| 2013/0198273 | A1* | 8/2013 | Vago et al. .................... 709/203 |

* cited by examiner

*Primary Examiner* — Evans Desrosiers
(74) *Attorney, Agent, or Firm* — Knobbe Martens Olson & Bear LLP

(57) ABSTRACT

Features are disclosed for facilitating content consumption and communication among a group of users. A content consumption group may be formed including any number of users, and content may be selected. Group members may consume roughly the same portion of the content at roughly the same time and share the consumption experience regardless of geographic location, user device, content format, on-demand consumption preferences, and the like. Policies may be defined or selected regarding the rate of content consumption, the communications and other inputs that may be submitted by group members, and the like. A shared content consumption management system may receive data from various user devices regarding each group member's current content consumption position, enforce group policies, and distribute group inputs. Group members may also communication in real time through various chats and other interactive features.

33 Claims, 10 Drawing Sheets

ARCHITECTURE FOR MODERATING SHARED CONTENT CONSUMPTION

BACKGROUND

Computing devices, including personal and mobile devices, may be used to read books and other textual content, listen to audio books and other aural content, and watch movies and other video content. Users may load content onto the devices or access network-based content. Consumption of the content may occur on-demand (e.g., electronic books) or in real time (e.g., live streaming content). Users may access reviews, ratings, and commentary contributed by other people in order to determine what others think about the content and related topics. In many cases, a user may contribute a review of his or her own in an effort to add to the discussion. Such reviews and other commentary may be posted to network-accessible message boards, content sales pages, and other network resources so that the commentary is available for others to see and potentially respond to.

Online groups, such as book clubs, may be created and joined to allow groups of users to consume a content item and communicate regarding the item via their own computing devices. In a typical implementation, such as a book club, users are encouraged to follow a predetermined reading schedule. Message boards, email groups, and other means of group communication may be created and accessed by group members. Each user may be responsible for following the schedule. In some cases, other users have no way of knowing for certain whether a particular group member has indeed followed the schedule. In addition, group members may have to manually moderate group discussions and other communications.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
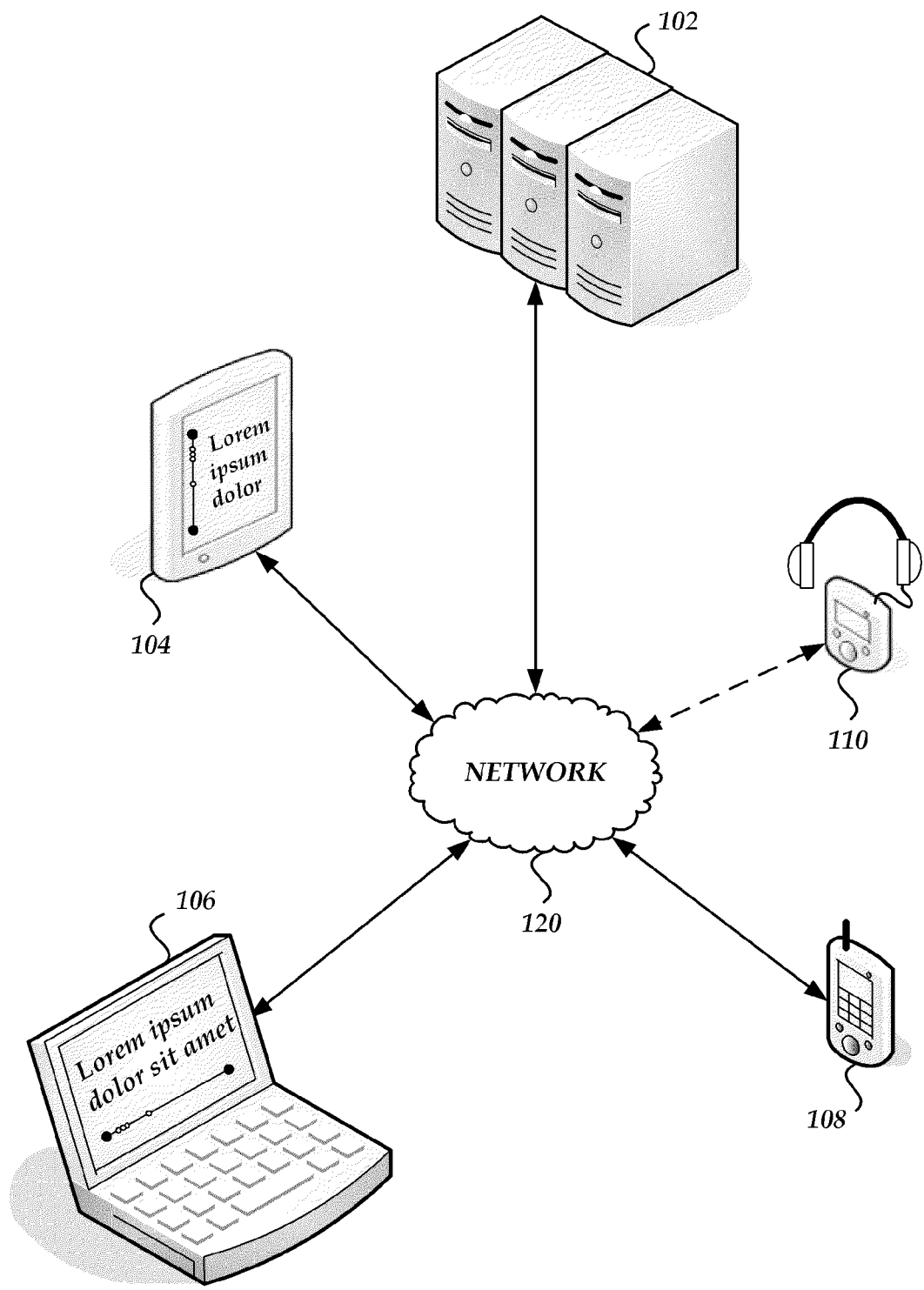
FIG. 1 is a block diagram of an illustrative networked content consumption environment including several devices for consuming content and a shared consumption management system.

Generally described, the present disclosure relates to facilitating content consumption and communication among a group of users. Aspects of the present disclosure relate to the formation of a content consumption group, selection of content to be consumed, definition of group policies, and enrollment of users. For example, a group may be created by a user or moderator, who selects content and defines policies regarding the rate at which group members are to consume content, how users may communicate while consuming content, and the like. In some embodiments, users may indicate a willingness to form a group, and a group may be formed automatically or after a threshold number of users have done so. The users may then decide on group polices, such as by voting.

Additional aspects of the present disclosure relate to a system for enforcing polices and facilitating communication between the users/group members. For example, a shared content consumption management system may receive data from various user devices regarding each group member's current content consumption position, e.g., what page of an electronic book the user is currently reading. The management system may determine whether users are out of position or otherwise not satisfying a group policy, notify the user, and take other actions accordingly. The management system may also receive communications, annotations, ratings, and other commentary from users and make that commentary available to the group as a whole or to individual members thereof.

Although aspects of the embodiments described in the disclosure will focus, for the purpose of illustration, on features provided by a central shared consumption management system and various user devices, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative example, users may form a group for shared consumption of content. The content may include, but is not limited to, electronic books and other textual content, audio books and other audio content, or movies and other video content. Shared consumption of content may be based on consumption, by multiple users, of substantially the same content at substantially the same time. By maintaining the same or similar content consumption positions among members of the group, communication and other user commentary may be more meaningful as group members experience, discuss, and interact with the content together regardless of geographic location, content format, consumption method, or the on-demand consumption of each group member. Group members share not only their commentary about the content (e.g., reviews and ratings), but also share the experience of consuming the same content at the same time. Through the use of graphical interface and audio features, group members may have a sense of each others' presence, of their reactions to the events of the content, etc. In some cases, group members may communicate in real time.

The concept of sameness in time and content position is flexible due to the increasing popularity of on-demand content consumption and mobile personal devices. Accordingly, policies regarding how to determine whether users are consuming the same content at the same time may vary from group to group or even within a group. For example, users who are listening to some part of the same chapter of an audio book within the same 24-hour period may be consuming the same content at the same time. In some cases, the policy may be changed as the group progresses further into a book and the concept of a chapter becomes less important than passing certain points within the content (e.g., spoiler points). As another example, the policy may change or be changed in order to keep the consumption position of the group members within close proximity to each other due to the rapidly changing nature of the content's subject matter or plot, such as within in a time window of 10 minutes of each other's playback positions during important portions of an audio book. As a further example, some group members may be listening at literally the same time, such as in the case of real-time, multicast streaming.

As users consume content, data regarding their position within the content may be transmitted to a shared consumption management system. The management system may process the position data to determine whether a user's position satisfies the group policy. If the user's position does not satisfy the group policy, the user may be notified and may also be disallowed from participating in group interactions until the user's current content consumption position satisfies the policy. This can prevent one user from spoiling content events or details for other group members, and also prevent one user from holding the group back or otherwise interfering with group interaction due to being behind the required or desired position within the content relative to other group members.

Group members may consume content from a variety of devices, such as desktop computers, laptop computers, tablets, electronic book readers, smart phones, gaming devices, media players, smart televisions, home appliances, home stereos, car stereos, and the like. Each user of a group may utilize a different type of device to consume the content. Hardware and software of the various devices may expose group interaction and content commentary features, and the features exposed may be consistent across device types or may be customized for specific device types. For example, a desktop computer may utilize a browser application to load a network accessible content page (e.g., a web page) that shows a timeline of the content indicating the current consumption position of each group member and commentary by the group members that is tied to a specific point within the content. The content page may also include message boards for asynchronous group communication and text, voice, or video chat rooms for synchronous, real-time or substantially real-time group communication.

An electronic book reader, for example, may display a timeline along an edge of the display by default, periodically, or on-demand. The timeline may be similar to the timeline displayed in the web page accessed by the user of the desktop computer, or it may expose features designed more specifically for electronic book readers, such as in-line annotations and comments regarding text on the display. Users of audio devices such as personal music players or smart phones for listening to audio versions of the content may be presented with aural notifications of commentary from other users as commentary is encountered within the content. The users may add their own commentary through recorded speech or speech recognition. Users may also pause audio presentation of the content and access a secondary audio program or stream of group interaction that in some cases may include real time interaction between group members.

Networked Content Consumption Environment

Prior to describing embodiments of the shared content consumption process in detail, an example networked content consumption environment in which the process may be implemented will be described. FIG. 1 illustrates a networked content consumption environment including a shared consumption management system 102 and various user devices 104-110 communicating over a communication network 120. The communication network 120 may be any wired network, wireless network, or combination thereof. In addition, the network 120 may be a personal area network, local area network, wide area network, cable network, satellite network, cellular telephone network, or combination thereof. For example, the communication network 120 may be a publicly accessible network of linked networks, possibly operated by various distinct parties, such as the Internet. In some embodiments, the communication network 120 may be a private or semi private network, such as a corporate or university intranet. The communication network 120 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The user devices 104-110 can correspond to a wide variety of electronic devices. In some embodiments, one or more user devices 104-110 are mobile devices that include one or more processors and a memory which may contain software applications executed by the processors. User devices 104-110 may include speakers and/or displays for presenting content. In addition, the user devices 104-110 may be configured with one or more wireless network antennae or wired ports to facilitate communication with other devices and with the shared consumption management system 102. The software of the user devices 106 may include components for establishing communications over the communication network 120. In addition, the software applications may include multimedia applications which play or otherwise execute audio programs such as music or audio books, video programs such as movies or television shows, and video games. As illustrated in FIG. 1, the user devices may include a tablet computing device or electronic book reader 104, a laptop computer 106, a mobile phone 108, or a personal audio player 110. However, those skilled in the art will recognize that user devices may also include, without limitation, tablet computers, personal computers, personal digital assistants (PDAs), hybrid PDA/mobile phones, electronic book readers, set-top boxes, cameras, digital media players, video game consoles, kiosks, televisions, gaming devices, processors, integrated components for inclusion in computing devices, appliances, electronic devices for inclusion in vehicles, gaming devices, etc.

The shared consumption management system 102 illustrated in FIG. 1 may correspond to a computing device configured to manage content consumption among the user devices 104-110. For example, the shared consumption management system 102 may include one or more processors and a computer storage or memory which contains software applications or modules executed by the processors. The services provided by the shared consumption management system 102 can include receiving data regarding the current content consumption position on individual user devices, determining whether the current content consumption position satisfies group policies regarding the position, facilitating user commentary regarding content, and facilitating user interaction. In some embodiments, the shared consumption management system 102 may correspond to a logical association of one or more computing devices, such as an application server for maintaining group policies and streaming content, a web server for creating and transmitting user interfaces, and a database server for storing data regarding groups, users, content, policies, comments, and the like. In some embodiments, the features and services provided by the shared consumption management system 102 may be implemented as web services consumable via the communication network 120. In further embodiments, the shared consumption management system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the networked content consumption environment may include additional or fewer components that those illustrated in FIG. 1. For example, the networked content consumption environment may include two or more shared consumption management systems 102 configured for load balancing, redundancy, or to operate independently of each other. As another example, user devices may communicate with each other and with the communication network 120 via a local area network (LAN). As a further example, the networked content consumption environment may not include a separate shared consumption management system 102. Rather, the features of the shared consumption management system 102 may be implemented by a user device, such as a desktop computer, that is also used to consume content and participate in group interactions.

Figure 2:
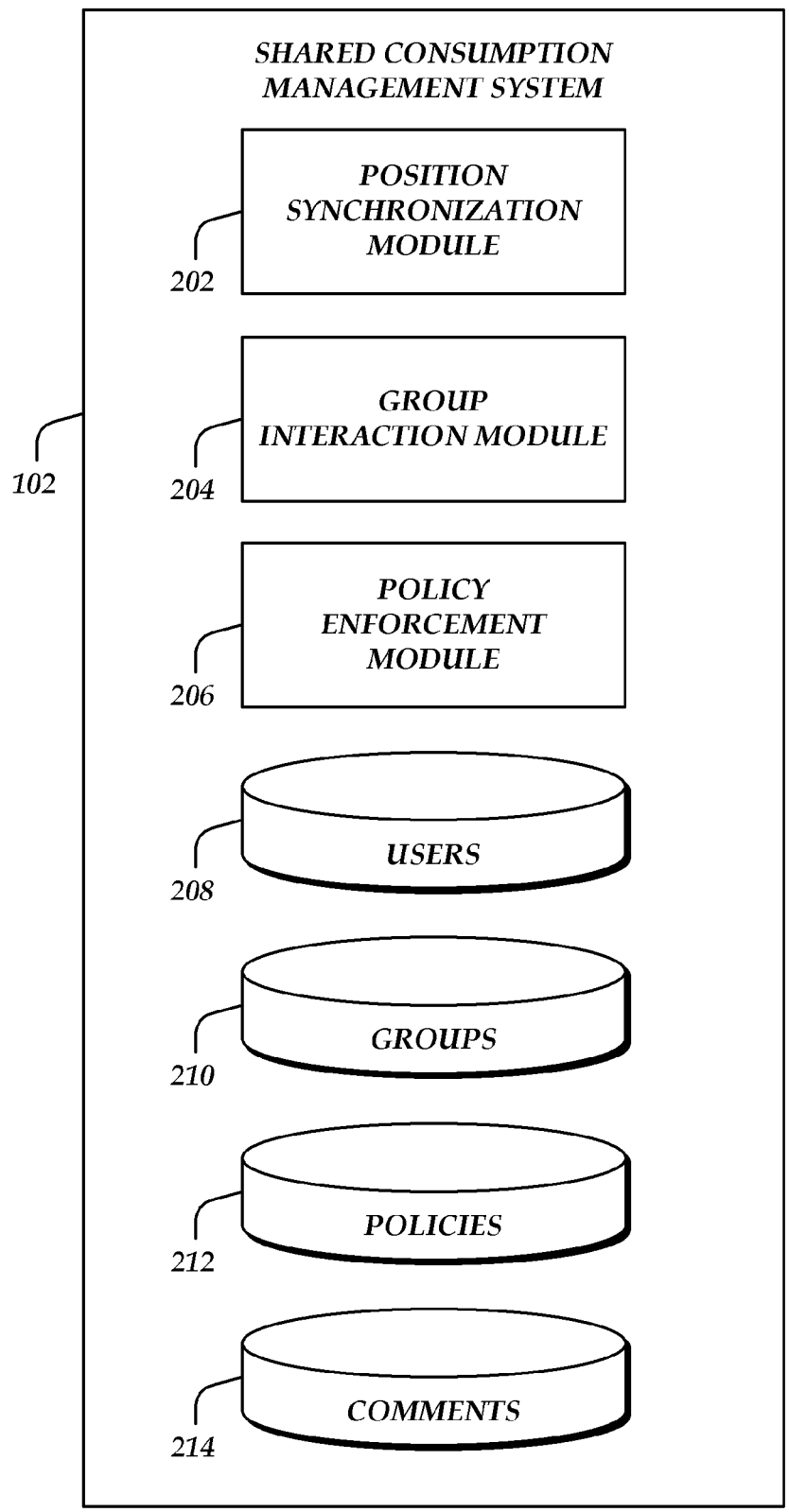
FIG. 2 is a block diagram of an illustrative shared consumption management system.

Turning now to FIG. 2, an illustrative shared consumption management system 102 will be described. The shared consumption management system 102 may execute a position synchronization module 202, a group interaction module 204, a policy enforcement module 206, a users data store 208, a groups data store 210, a policies data store 212, and a comments data store 214. Each module of the shared consumption management system 102 may be implemented on a separate computing device, such as a server computing device, or one or more of the modules may be implemented on the same computing device. In addition one or more of the data stores 208-214 may be remote from the shared consumption management system 102 and/or may be implemented as a web service itself. In some embodiments, the shared consumption management system 102 may include additional or fewer modules and/or data stores than those illustrated in FIG. 2.

The position synchronization module 202 can obtain data regarding the current content position from one or more user devices, save the data in the users data store 208, and transmit current content position data to user devices of other members of the content consumption group, as may be defined by data in the groups data store 210. The position synchronization module 202 may also pass or otherwise provide current content position data to the policy enforcement module 206 for processing, as described below. Generally speaking, a current content position may refer to any information that reflects a current playback, reading, or other presentation position of a content item, or to any measurement of an amount of content consumed by a user. For example, a current content position of an audio book may be indicated by a timestamp, a counter, a chapter, a last spoken word, etc., or any combination thereof. A current content position of an electronic book may be indicated by a page number, embedded position indicator, last word highlighted or made visible on the display, etc. In some embodiments, a current content position may be reflected as a percentage (e.g., a point representing 25% of the content has been consumed). In other embodiments, a current content position may be reflected as an absolute value (e.g., 2 hours, 30 minutes and 5 seconds into an audio book or 13,595 words into an electronic book). A current content position may be reflected by any combination of the above information, or any additional information reflective of current consumption position within a content item. In some embodiments, data regarding the current content position may reflect the play position at which a device has stopped presenting content or will stop presenting the content. If a user device is playing back streaming content from another system, the position synchronization module 202 optionally obtains the current content position from the system streaming the content. One example of a system for maintaining current content positions of client devices is disclosed in U.S. patent application Ser. No. 12/273,473, filed on Nov. 18, 2008 and titled SYNCHRONIZATION OF DIGITAL CONTENT, the contents of which are hereby incorporated by reference.

The group interaction module 204 may receive user ratings, commentary, and other communications, store data regarding the communications in the comments data store 214, distribute the communications to one or more users of the group as defined by data the groups data store 210, and the like. In some embodiments the group interaction module 204 may correspond to a web server or web service provider that generates user interfaces (e.g., HTML documents), provides data feeds to user devices and/or facilitates communication between user devices. User communications are not limited to annotations and messages, but may also include without limitation: indicating like/dislike or a score of the content at a point in time; indicating like/dislike or a score of a passage; submitting photos or drawings related to content; indicating mood or level of interest (e.g., sad, anxious, happy, scared, bored); indicating like/dislike or a score regarding other user communications; sharing passages; and so on. In addition, data regarding portions replayed/reread or skipped may be tracked and submitted so that other users of the group may see which passages or portions are popular or unpopular. The group interaction module 204 may process and distribute data regarding these and other interactions to other members of the group.

Upon receipt of data from the group interaction module 204, user devices may display, play, or otherwise present communications or indications that communications are available. User devices with visual displays (e.g., tablet computers; electronic book readers) may be provided with visual representations of communications from other users. For example, likes/dislikes and scores may be visually presented to users as icons in content text or associated with a content timeline, audio comments may be transcribed using speech recognition software and presented in text format, etc. Geographic maps and heat maps may be used to aggregate user comments or display data regarding user comments in alternate ways. Icons, colors, and other visual treatments may be applied to references to various group members to indicate how they are consuming content (e.g., electronic book, audio book), whether they are travelling, whether they are currently consuming content or otherwise available for real time communication, etc. The group interaction module 204 may provide user devices that include audio output components (e.g., personal audio players) with aural representations of communications from other users. For example, likes/dislikes and scores may be aurally presented to users as tones, sound effects, or supplemental audio tracks. Textual comments may be converted to audio format using text-to-speech components and presented as a supplemental track.

Users may customize the way in which they are presented with communications and interactions from other users. Data regarding the customizations and preferences may be saved and applied locally at the user device, or stored by the shared consumption management system 102 at the users data store 208 and applied by the group interaction module 204. Customizations or preferences may include filtering interactions and communicates to display only those entered in the last N minutes (where N represents a static or dynamic number of minutes), only those entered in a certain format (e.g., text, audio), only those entered by users who are currently available to communicate in real time, only those entered by users in a geographic area or associated with certain demographic data, only those entered by specified users, and the like.

As previously described, the group interaction module 204 may facilitate real-time communication between users. The real-time communication may be tailored to the individual user devices involved. Devices with visual displays may be presented with a text chat room. Devices with visual displays, video cameras, and high speed network connections may participate in video chats. Audio chats may be initiated between user devices that include audio input and output components, and may resemble a conference call. A combination of approaches may be used to facilitate communication between users of different types of user devices. For example, an audio-only device (e.g., a personal mobile music player) may utilize text-to-speech and speech recognition components to exchange messages with users of visual-only devices (e.g., electronic book reader). In some embodiments, a moderator or group administrator may participate and moderate the communications, flagging comments of interest and otherwise guiding the communication.

The policy enforcement module 206 can process data received from user devices, apply polices from the policies data store 212, and determine whether the content consumption and communications of users satisfy the policies of the group. For example, as described above, the policy enforcement module 206 may determine whether the current content positions received from user devices satisfy the group polices, notify user devices when they do not, and implement measures such as disabling future comments from users, restricting user access to group communications, and the like. Additional group policies may be implemented regarding group communications. For example, if the group is a school-related group of students moderated by a teacher, policies may be set regarding profane language and other communications which may be inappropriate in a school setting. As another example, a group policy may relate to a minimum or maximum number of communications from group members.

Shared Content Consumption Group Lifecycle

Figure 3A:
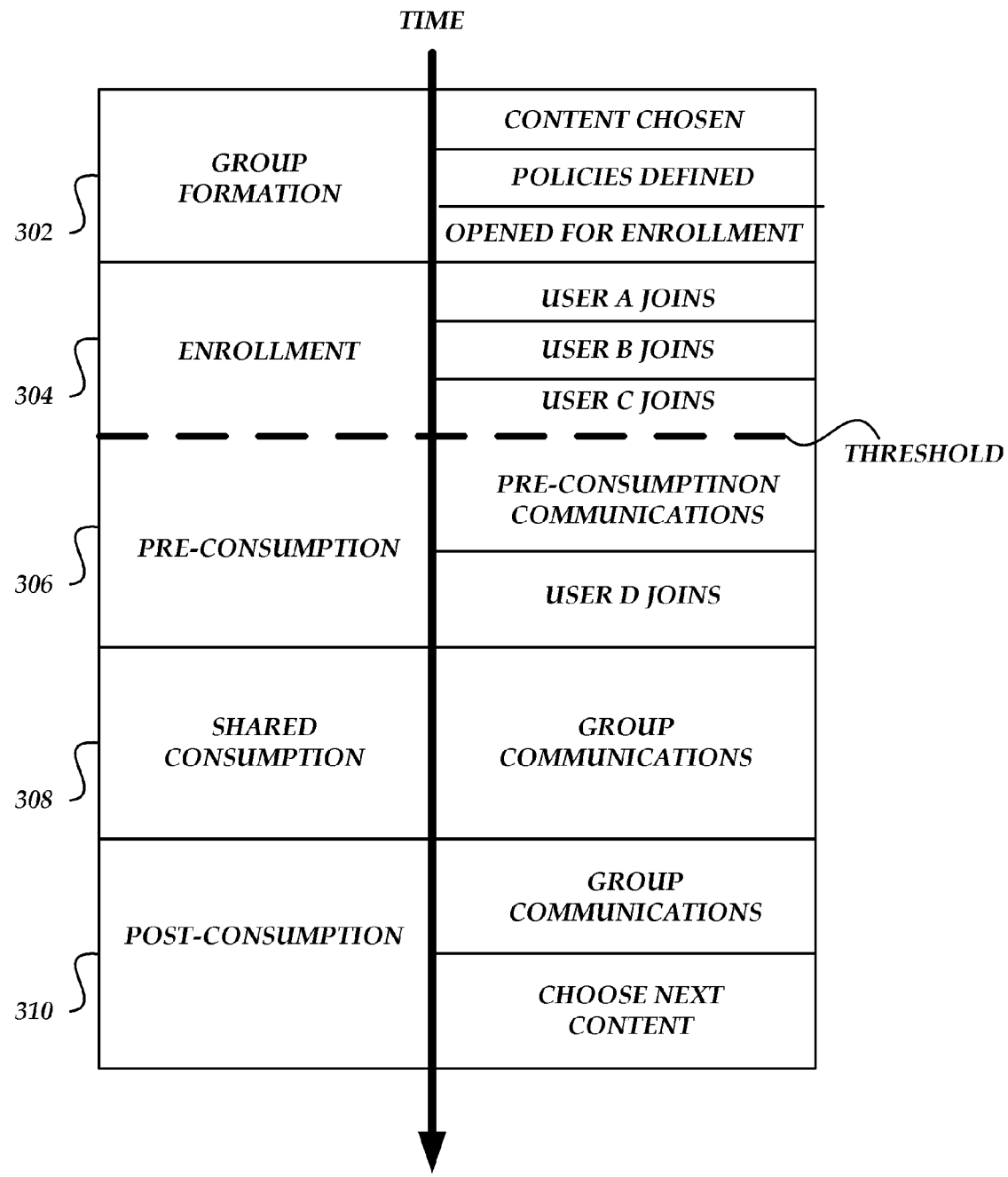
FIG. 3A is a timeline diagram of an illustrative shared content consumption group lifecycle.
Figure 3B:
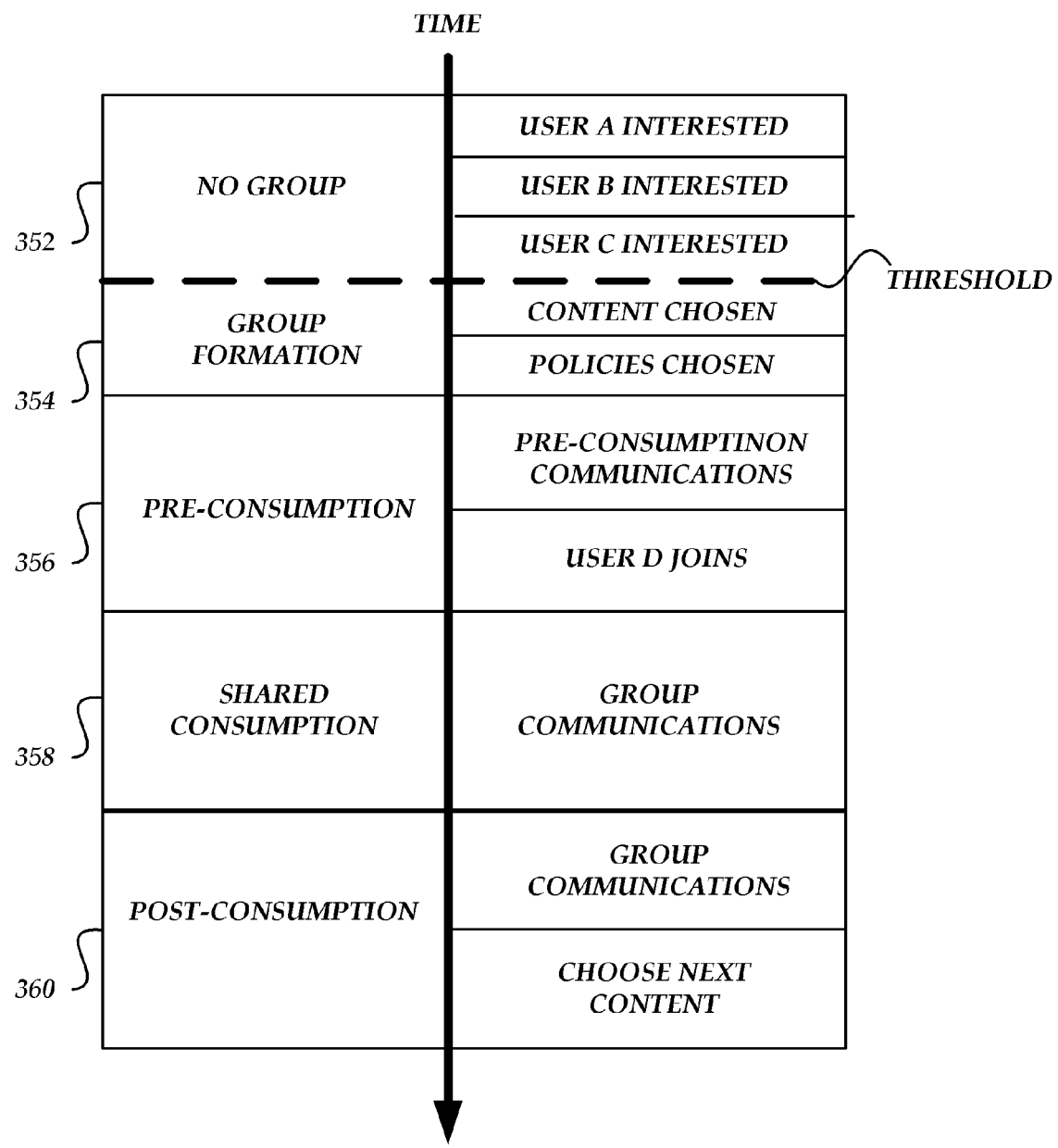
FIG. 3B is a timeline diagram of an alternative shared content consumption group lifecycle.

Turning now to FIGS. 3A and 3B, illustrative lifecycles of shared content consumption groups will be described. With reference to FIG. 3A, a user may choose content, define policies, and open a group for enrollment during the group formation period 302. For example, a moderator may desire to create a group for shared consumption of a particular content item, such as a specific book. In some embodiments, the moderator may be a professor or classroom teacher, a creator of the content item (e.g., publisher, author, narrator), an interested reader/content consumer, or any other interested party. The moderator may create the group with the shared consumption management system 102, which can store data regarding the group, such as the chosen content and the identity of the moderator, in the groups data store 210. The moderator may define certain polices regarding shared content consumption, such as each member of the group must read or listen to the same chapter each week, the group members must stay within one chapter of each other or the moderator, the group members must follow or stay within a threshold of a predetermined reading schedule, etc. Other policies may be defined regarding communication methods (e.g., text only; every user must contribute weekly). Data regarding the various policies may be stored by the shared consumption management system 102 in the policies data store 212. When a group is opened for enrollment, information about the group may be made available by the shared consumption management system 102, such as an announcement on a web page or by including the group in search results.

During the enrollment period 304, prospective group members may be alerted of the opportunity for enrollment by the shared consumption management system 102, or they may proactively search for groups currently accepting enrollment. Data regarding enrolling users may be stored by the shared consumption management system 102 in the users data store 208. Group members may provide demographic data, such as name, location, age, gender, interests, and the like. Such information can optionally be shared with other group members, or groups may be formed based on such demographic information.

When a threshold number of users has joined the group, the pre-consumption period 306 may begin. In some embodiments, there may not be a threshold. Rather, the group is to proceed regardless of how few or many users may join. During the pre-consumption period 306, group members may communicate with each other regarding the content to be shared or other topics. In some embodiments, there may be no separate pre-consumption period 306 and enrollment period 304, or the two periods may overlap or occur simultaneously. Group members may communicate immediately after joining the group and new members may enroll even after the enrollment period 304 ends.

Various data feeds and accounts may be created for the group that members may access, such as social networking pages and groups, blogs, microblog accounts, message boards, and the like. For example, each time a group is formed, a social network group or microblog account can be created for it, enabling posts and communications to the microblog or social network as a means for communicating to and from the group members. All shared content consumption group members can access the microblog or social network by default, and all group communications may automatically be posted to the microblog account or social network group for dissemination to the shared content consumption group members. In some embodiments, the microblog account or social network group may be publically available, at least for viewing. Users outside of the shared consumption group may be allowed to view comments and follow the group's progress. Such users, who are not sharing the content consumption experience with the group, may monitor the group's reactions to a content item. For example, if a user had already read, viewed, listened to, or otherwise consumed the content and enjoyed it, that user may wish to follow the comments and shared consumption experiences of other users.

At a predetermined or dynamically determined time, the shared content consumption group may begin the shared consumption period 308. During the shared consumption period 308, users read, view, listen, or otherwise consume the content, submit commentary and communications, interact with other users, and the like. After the group has finished the content, a post-consumption period 310 may begin. During the post-consumption period 310, users may communicate final thoughts regarding the content or other subjects and choose the next content that the group will consume together. In some embodiments, there may be additional or fewer distinct periods in the shared content consumption lifecycle, periods may overlap or occur in a different order, or some periods may repeat. For example, if the group is consuming a content item that is part of a series, the post-consumption period 310 may mirror the pre-consumption period 306, followed by a period of shared consumption 308 for the next content item in the series.

There are a variety of ways a shared content consumption group may be created and managed. Turning now to FIG. 3B, an alternative method will be described. A group of potential members can arise automatically based on the fact that they are listening to the same content at the same time. As described above, the concepts of same content and same time can be flexible. For example, users may register accounts with the shared consumption management system 102, which then tracks which content is being consumed by each user. The shared consumption management system 102 can alert users when it detects that there are multiple users consuming the same content item within a threshold current content position of each other. Users may then opt-in to the automatically formed group.

An optional group formation period 354 may follow, where users agree on the content, determine polices, and the like. For example, the users may appoint a moderator to define polices, vote on individual polices, or select a predefined set of group polices. The group formation period 354 may be followed by, overlap with, or occur simultaneously with a pre-consumption period 356, similar to the pre-consumption period 306 described above with respect to FIG. 3A. Additional users may be allowed to join or invited to join, depending on group policies. The shared consumption 358 and post-consumption 360 periods may follow, similar to the corresponding periods described above with respect to FIG. 3A.

In some embodiments, users may proactively request to be placed into groups. For example, a user may request to be notified whenever a group is listening to a specific audio book, an audio book in a specific genre, by a specific author, narrated by a specific narrator, a combination of these, etc. Users may publicly expose which content they are consuming to other users for purposes of being invited into a group or automatically selected for or placed into a group. For example, a listener could "check-in" to a book, genre, author, narrator, geographic location, demographic category, or some combination thereof. Other users who "check-in," or otherwise self-identify with such categories or tags, may coordinate formation of a shared content consumption group.

Current Content Position Verification Process

Figure 4:
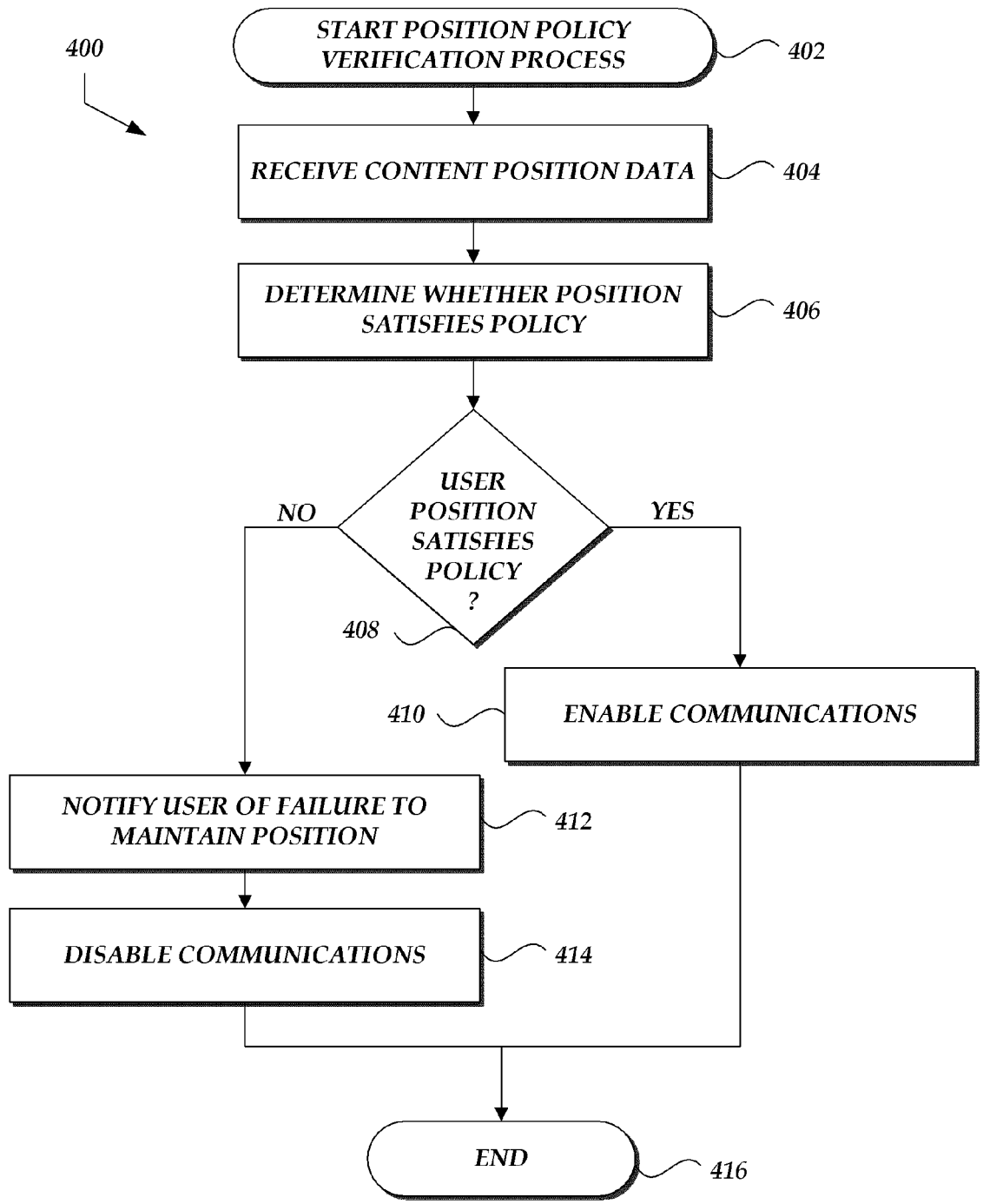
FIG. 4 is a flow diagram of an illustrative process for verifying that a user is satisfying a policy related to content consumption position.

FIG. 4 illustrates a sample process 400 for verifying that users are satisfying the group policy regarding current content position. While the description of the process 400 which follows focuses on an implementation by the shared consumption management system 102, individual user devices may also be configured to perform the process 400 or a variant thereof for enforcing a group policy regarding current content position. The process 400 can be implemented as a software module or collection of modules residing within non-transitory computer storage, such as RAM, ROM, a hard disk, or the like, of a computing device associated with the shared consumption management system 102. One or more processors of the computing device can execute the software module.

The process 400 begins at block 402. The process 400 may be a background process that executes continuously on a shared consumption management system 102, such as by a position synchronization module 202, a policy enforcement module 206, or some other module. Alternatively, the process 400 may be instantiated whenever current content position data is received from a user device or otherwise obtained.

At block 404, the position synchronization module 202 can receive content position data from one or more user devices. User devices may submit content position data automatically, such as upon initialization of a program or module that presents content to the user, upon termination of the program or module, or periodically as the program executes. In some embodiments, the user device may establish a network connection with the shared consumption management system 102, and the shared consumption management system 102 may request the current content position. In some embodiments, the user may manually submit the current content position to the shared consumption management system 102. For example, a user of a user device may wish to consume content in the absence of a network connection (e.g., while in an area without network access or to conserve battery life). The user may manually synchronize shared content consumption data with the shared consumption management system 102 so that the user has access to the most up-to-date group communications and other inputs.

At block 406, the policy enforcement module 206 or some other module of the shared consumption management system 102 may determine whether the user or users for whom current content position data has been received satisfy the content position policy of the group. One content position policy that can be implemented is a predefined content consumption schedule, such as one chapter of a book per week. Data may be received from electronic book readers indicating the current page that the user is on, and data may be received from mobile phones indicating the current elapsed play time at which the user last stopped for an audio book version of the book. A cross reference table or independent service may be consulted to translate the positions for different versions of content into a consistent content position for comparison.

Figure 5A:
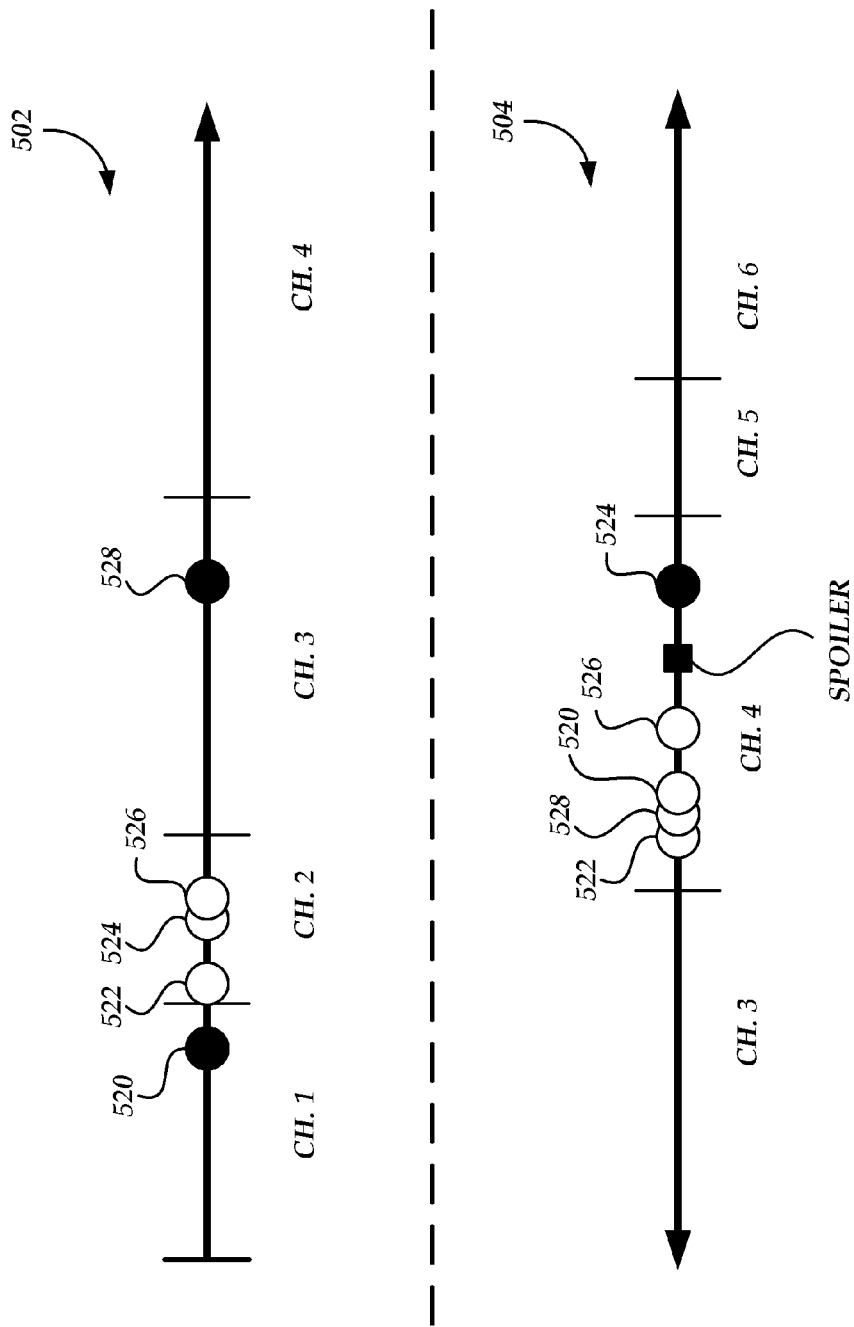
FIG. 5A is a timeline diagram of an illustrative shared content consumption policy.

As described above, content position policies may be implemented regarding the relative content positions of each user, rather than predetermined consumption schedules. For example, all group members may be required to have consumed a portion of the same chapter in a 48 hour period of time, or have a current content position within the same chapter. FIG. 5A illustrates a sample content timeline 502 and current content positions for several users 520-528. The timeline 502 also indicates the chapters of the sample book that it represents. As seen in FIG. 5A, users 522, 524, and 526 have a current content position in chapter 2, while user 520 has a current content position in chapter 1 and user 528 has a current content position in chapter 3. In this scenario, users 522, 524, 526, and 528 may be considered to have satisfied the policy that each user consume a portion of the same chapter in the same 48 hour period, so long as user 528 did in fact consume a portion of chapter 2 within the previous 48 hours. User 520, however, has not yet reached chapter 2, and therefore does not satisfy the policy. Alternatively, if the policy requires each user to have a current content position within the same chapter, then neither user 520 or 528 satisfy the policy.

Timeline 504 illustrates another sample policy that may be implemented. In timeline 504, users 520-528 each have current play positions within chapter 4, and therefore each user would satisfy the previously described polices. However, chapter 4 includes a location of an important plot development, which introduces the risk of a spoiler. Users who pass the "spoiler point" and submit comments regarding it may interfere with the enjoyment of other group members, and therefore, users passing the location of the important plot development may be disabled from submitting communications, as described below, even though the user maintains a current content position within the same chapter and otherwise satisfies content position policy. Once a majority or threshold amount of the remaining users also reach and pass the point of the important plot development, that group of users—including user 524—may be considered to satisfy the policy. Any remaining users who have not passed the spoiler point may not be considered to satisfy the policy and may therefore be prevented from seeing or otherwise accessing group communications, as described below, in order to preserve their enjoyment as they proceed with content consumption and reach the point of the important plot development.

Spoiler points may be determined by group members as they encounter them. For example, user 524 may indicate that a spoiler point exists at a position within chapter 4. Other users may be given the option of confirming, modifying, or removing the spoiler point as they encounter or pass it. In some embodiments, a moderator with prior knowledge of the content item may specify spoiler points for the group. In some embodiments, a repository of spoiler points may be accessed, such as an independent service that indicates spoiler points of various content items.

Figure 5B:
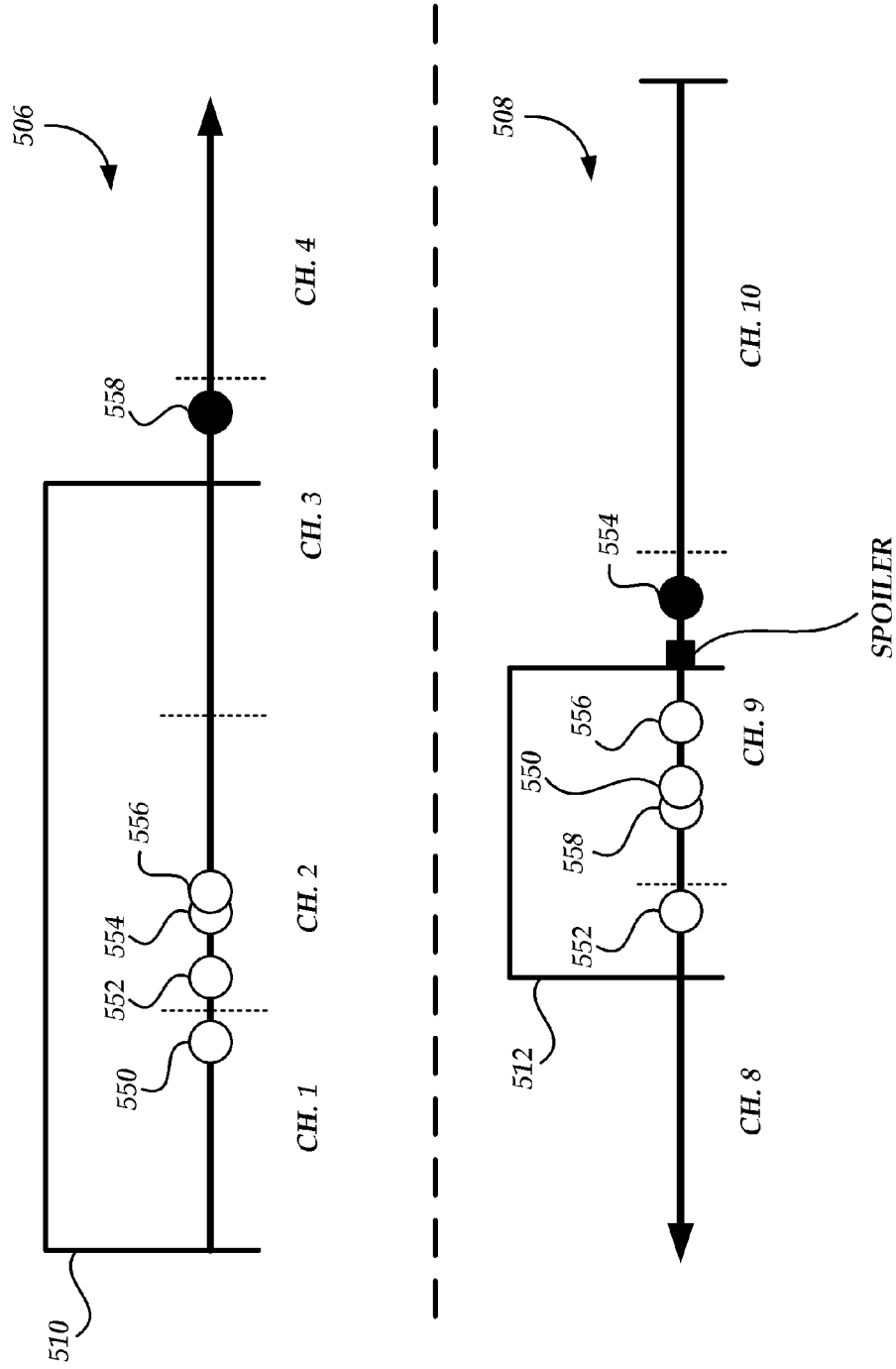
FIG. 5B is a timeline diagram of an alternative shared content consumption policy.

FIG. 5B illustrates another example of a current content position policy. The timeline 506 indicates chapters of a book, similar to the timelines 502, 504 of FIG. 5A. However, the policy may differ from the policies described above in that users are required to maintain a position within a moving range, rather than required to pass stationary checkpoints. The ranges may be sized by moderators, by users at the leading edge of the group, or by a predetermined set of ranges in a table or available from an independent service, such as one provided by the publisher or author of the book, the studio or director of a movie, etc. The range 510 illustrated in timeline 506 is fairly large, encompassing all or part of three chapters. Such a large range may be appropriate in the early stages of a book as background information is presented, characters are developed, and the plot has not yet reached a spoiler point. The center point of the range 510 may correspond to an average or median position of the group of users as a whole or some subset thereof. User 558 is outside of the range 510, and therefore does not satisfy the policy. Timeline 508 illustrates a later point within the same content item. The range 512 is smaller, encompassing only portions of two chapters. This may reflect the later position within the content when events may change more rapidly than during the earlier chapters. Additionally, the range may shrink as it approaches a spoiler point, and users on the other side of the spoiler point, such as user 554, are outside the range 512 even though they are within the same chapter as most other users.

At decision block 408, if the user's current content position satisfies the policy, the process 400 proceeds to block 410. Otherwise, the process 400 proceeds to block 412.

At block 412, a user may be notified that the current content position received from the user device associated with the user does not satisfy the policy. The notification may include a message, a tone, a visual effect, or some other indication that may be recognizable to the user. At block 414, the communications to and/or from the user may be disabled due to the failure to satisfy the content position policy of the group. In some embodiments, the user may be blocked from participating or accessing any or all group activities. In some embodiments, users may be removed from the group for failure to satisfy the policy, such as if the user fails to satisfy the policy more than a threshold number of times.

For example, if a user has a content position that is ahead of the position or range of positions required by the policy, the user may not be allowed to submit certain or all commentary and other communications, but may continue to access the commentary and communications of other users. Certain communications from the user may risk divulging important plot developments, as described above. In some embodiments users that are ahead of the position required by the policy may be allowed to submit commentary or communications that do not risk spoiling important content developments for other group members. For example, such a user may be permitted to indicate like or dislike of a portion of the content, to update the user's mood indicator, and the like. In some embodiments, the user may be permitted to continue submitting all communications other than real-time communications, and the user's communications will withheld from the rest of the group until the other group members catch up, pass the spoiler point, etc.

Users associated with current content positions which are behind the position or range of positions required to satisfy the policy may be prohibited from submitting communications or viewing communications of others. Preventing users from accessing communications of others protects the user from being exposed to spoilers, as enjoyment of the content consumption process may be important to the user regardless of the shared content consumption features. In addition, preventing such users from submitting comments can reduce the risk that the enjoyment of other group members may be negatively affected by being notified of recent comments regarding content portions that the majority of the group has long since passed. In some embodiments, users with content positions behind the positions required by the policy may continue to submit communications in order to compile a complete record of group interactions, while the other group members may not be notified of the communications but may still be able to access them if they wish. In some embodiments, users with content positions behind positions required by the policy may still submit one-on-one communications to individual group members, as the risk of affecting the enjoyment of large numbers of group members is reduced.

As users continue to consume the content, current content positions may be sent to the shared consumption management system 102. If, during a subsequent execution of the process 400, it is determined that a user that previously did not satisfy the content position policy now satisfies it, the user may be permitted to submit and access communications at block 410.

Content Interactions and Group Activities

Figure 6:
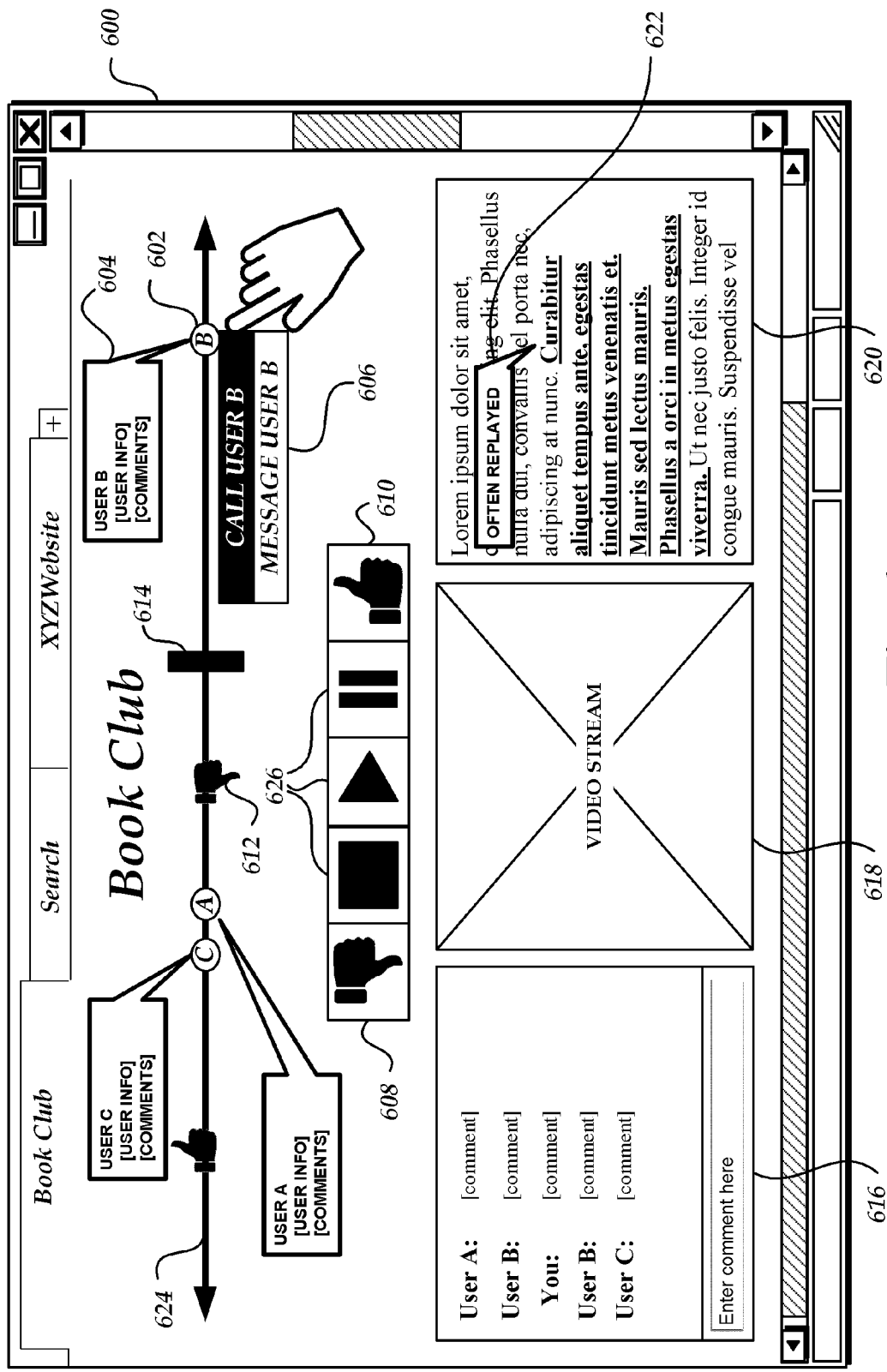
FIG. 6 is a user interface diagram of an illustrative shared content consumption group communication hub.

Turning now to FIG. 6, various group activities, user communications, and content interactions will be described. The user interface 600 illustrated in FIG. 6 is an example of a user interface provided by the group interaction module 204 of the shared consumption management system 102. As described above, the group interaction module 204 may generate HTML pages for transmission to user devices. Group members with access to a browser application and a network connection to the shared consumption management system 102 may request the group web page in order to submit commentary and interact with commentary of other group members. In some embodiments, the user interface 600 may be provided by an application executing on the user device, rather than one generated by the group interaction module 204. In such cases, the user device may establish a network connection with the shared consumption management system 102 in order to exchange data with the group interaction module 204 regarding user communications and the communications of other group members.

The illustrative user interface 600 of FIG. 6 includes a timeline 624 for displaying commentary and communications from other group members, and also for consuming content and submitting commentary and communications from the user of the user device. For example, the user's position may be indicated by position marker 614. The user may scrub the position marker 614 across the timeline 622 to change the current position within the content and therefore to initiate or control audio or video playback of the content from that position. The user may also utilize the content playback controls 626 to control playback of the content.

In some embodiments, text may be presented in text area 620 corresponding to the content portion currently being played in audio or video format. Visual treatments may be applied to the text, such as underlines or highlights to popular passages or passages associated with comments. Notations may be added which indicate the reason for the visual treatment. As seen in FIG. 6, notation 622 indicates that the underlined text in text area 620 is frequently replayed by users consuming audio or video versions of the content. Such frequently replayed portions may indicate that the portion is particularly interesting or important in the view of other group members.

User commentary and communications may be displayed at positions of the timeline 624. For example, visual indicators corresponding to the entry of likes and dislikes from other group members may be displayed, such as the dislike indicator 612 seen in FIG. 6. A dislike indicator may be displayed when a single user indicated dislike for a content portion, or when a threshold number of users indicate dislike for substantially the same content portion. Users may indicate likes and dislikes by activating like 610 and dislike 608 controls within the user interface 600. When a user activates the like 610 or dislike 608 control, a communication may be provided to the group interaction module 204 regarding the current content position, represented by the position marker 614, and data indicating whether the user activated the like 610 or dislike 608 control. The group interaction module 204 may store data in the comments data store 214 regarding the received interaction. In addition, the group interaction module 204 may update other user devices with data regarding the like/dislike. In addition to likes and dislikes, group members may indicate a score for the content or a portion thereof. For example, users may indicate that a passage gets an "A," a "9 out of 10," or some other score. Visual indicators of individual scores or aggregate scores may be displayed on the timeline 624. As described above, group members may also indicate their mood at a particular point in time or in response to a particular passage, and visual indicators of individual moods or the aggregate mood of the group may also be displayed.

Indicators of the current content position of other users may be displayed on the timeline 624. For example, position 602 indicates the position of another group member, in this case User B. Information about the user may be displayed, such as in an information balloon 604. The information may include demographic information about the group member, a summary of communications and other interactions submitted by the group member, the group member's current geographic location or mood, an indication of whether the group member is available for real-time communication, etc. Users may access such information by activating the position 602 corresponding to the group member or through some other user interface command. Users may also access options for interacting with other group members through similar techniques. As seen in FIG. 6, a user may click, tap, or otherwise activate the position indicator 602, and a context menu 606 may be displayed that provides options for interacting with the group member. Other methods of initiating interaction may include voice commands, keyboard shortcuts, touch screen gestures, and the like.

One method of group interaction may be via a message board or chat room. For example, the user interface 600 generated by the group interaction module 204 may include a chat room 616 that allows two or more group members to communicate with each other in substantially real-time through textual messages. The chat room 616 may be accessible to all group members, or a user may initiate a chat with one or more specific group members. In some embodiments, a message board may be provided instead of or in addition to the chat room. The message board may allow users to post comments and replay to previous comments while other group members are offline or otherwise not participating in the conversation. The comments may then be saved, for example in the comments data store 214, and remain available for viewing and response for a period of time or indefinitely.

Voice or video chats may be provided instead of or in addition to text-based chats. For example, the group interaction module 204 may facilitate a voice-based chat, similar to a direct telephone call or a conference call. The voice chat may be open to the entire group, or may be established among a subgroup of users. A video chat 618 may also be provided. The video chat 618 may be similar to a direct or conference call with the addition of a video component. Users with access to a video camera (e.g., a web cam) may transmit a video stream of themselves so that other users may see them within the video chat 618 area.

Electronic book readers, tablet computing devices, smart phones, and other mobile devices have different form factors and computing capabilities than standard desktop and laptop computers. While some devices may be capable of presenting the user interface 600 illustrated in FIG. 6, others may not have a large enough display, or may not have the hardware and software components to process the controls and features described above. For example, electronic book readers may be engineered to present text clearly and efficiently at the expense of effective audio and video content processing. Additionally, some users may not wish to access all of the features described above. In these and other cases, alternative user interfaces may be presented to users for interacting with other group members.

Figure 7:
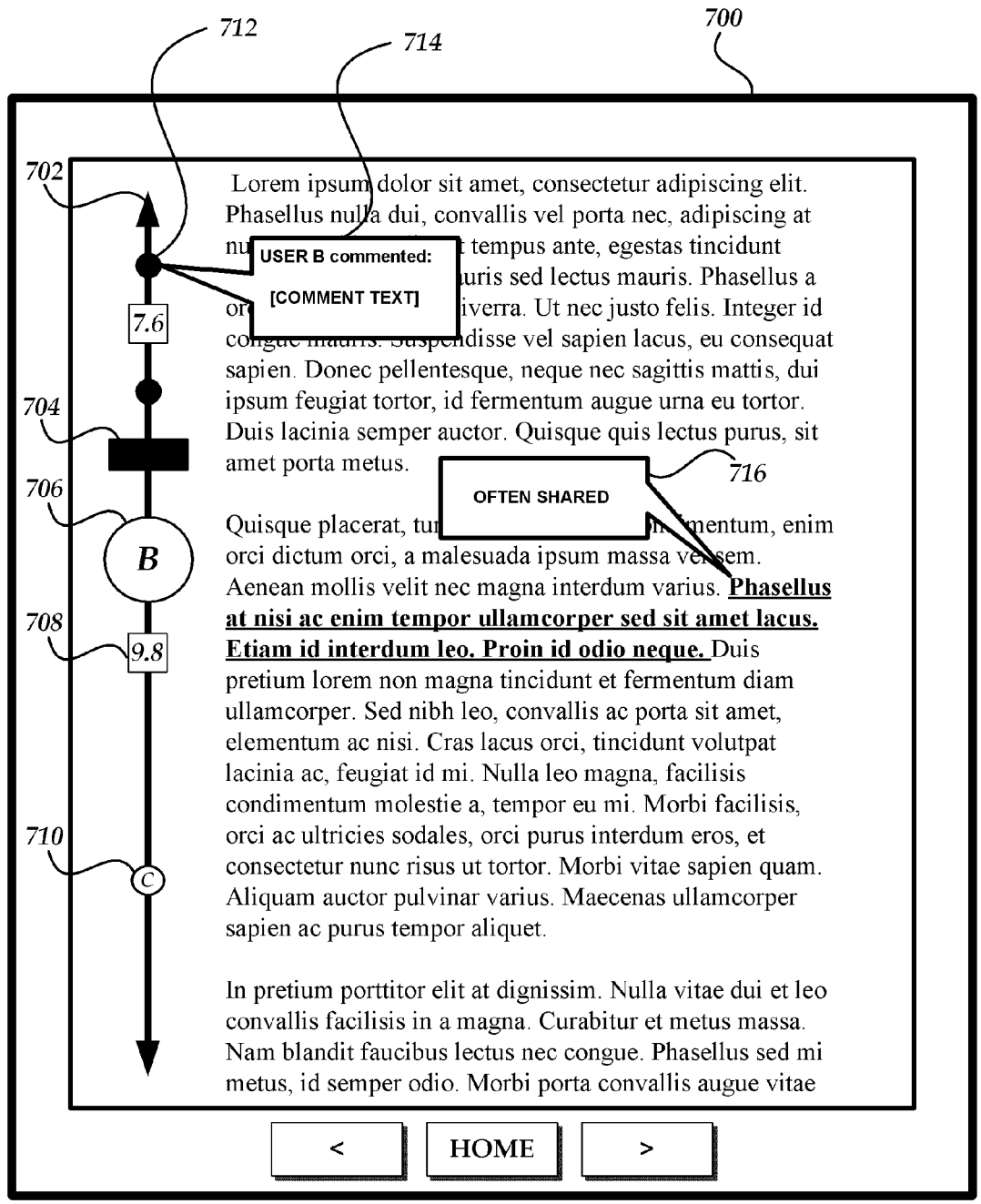
FIG. 7 is a user interface diagram of an illustrative user device displaying shared content consumption group communication features.

FIG. 7 illustrates an alternate user interface 700. The user interface 700 may be well suited for electronic book readers or tablet computing devices. As shown in FIG. 7, a substantial portion of the display is dedicated to textual content, such as electronic books and periodicals, documents, and the like. A timeline 702 may be presented, similar to the timeline 624 of user interface 600. The timeline 702 may correspond to the entire content item being consumed or some portion thereof. A current content position indicator 704 may be displayed corresponding to the user's current position within the content item. Content position indicators 706, 710 for other users may also be displayed, corresponding to current content positions of other group members. In some embodiments, visual treatments may be applied to the content position indicators 706, 710 to convey information about the users and/or the content. For example, the content position indicators may change size depending on their current proximity within the content to the user of the device, the volume of communications submitted by the group member, the current mood of the group member, geographic proximity to the user, etc.

Comments, ratings, likes/dislikes, and other comment and communications may be presented on the timeline 702. For example, a score 708 may be presented, representing an individual score or an average score for all group members at a particular point within the content. A comment indicator 712 may be presented for each comment added by group members, for popular or highly-rated comments, for comments representative of the comments entered by many group members, and the like. An information balloon 714 or some other information area may be displayed to present the comment text to the user. In some embodiments, such information areas may only be displayed in response to user activation of the comment indicator 712. Visual treatments may also be applied to passages of text in order to indicate a comment, highlight, or other annotation of a group member or several group members. Passages may also be highlighted, underlined, or have other visual treatments applied to them to indicate that they are often replayed (e.g., re-listened to in audio versions of the content) or shared with other group members or non-group members. Information balloons 716 and other information areas may be presented to display information related to passage or visual treatment applied thereto, such as the reason that the passage has be underlined.

Figure 8:
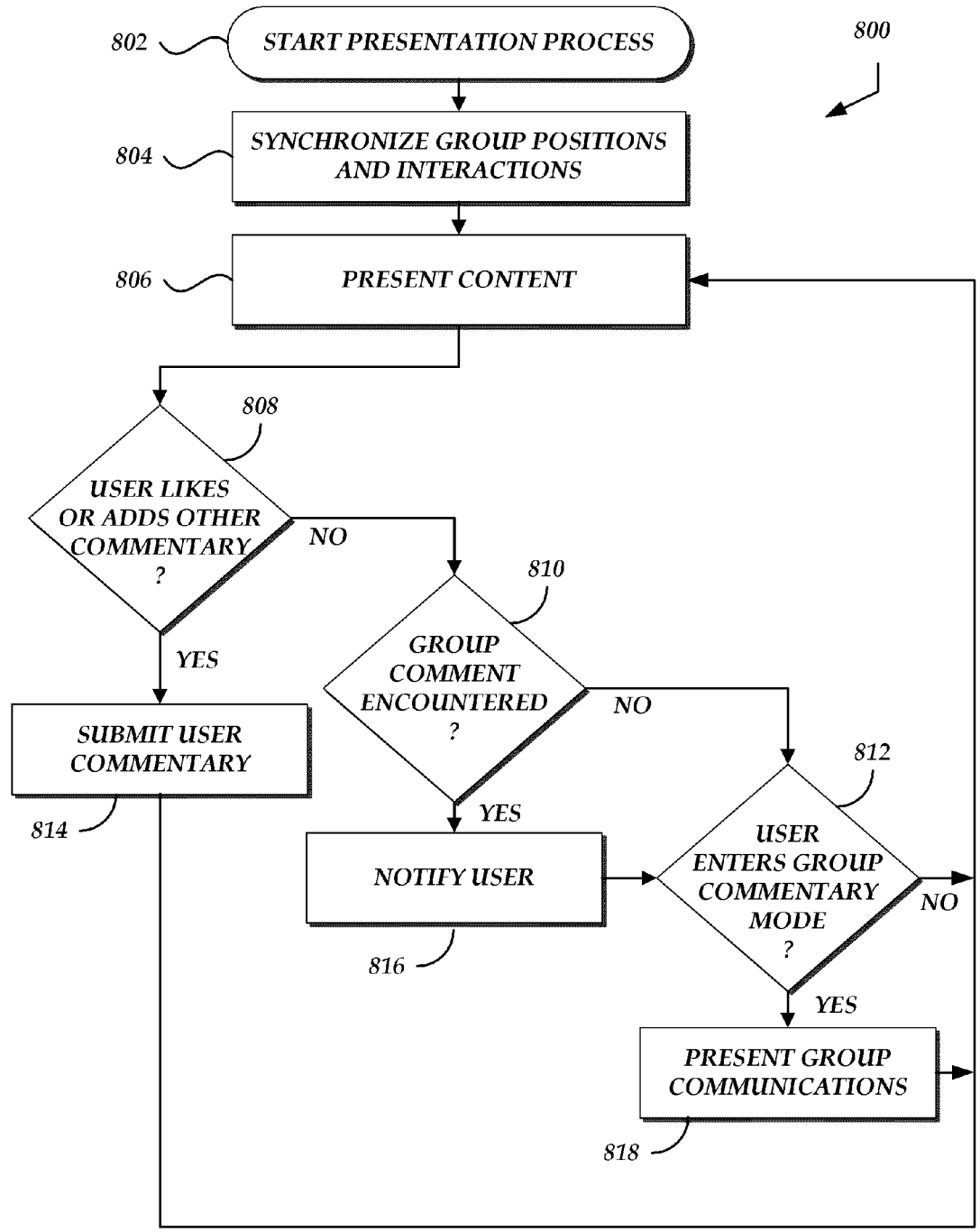
FIG. 8 is a flow diagram of an illustrative process for content consumption and access to group communication features.

Personal audio players and other devices may be used to listen to content rather than view it. Such devices may not be capable of visually presenting any information about the shared consumption of the group, and therefore features providing audio representations of group communications and other shared consumption information may be provided. FIG. 8 illustrates a sample process 800 for consumption of audio content and providing access to shared consumption features in audio format. While the description of the process 800 which follows focuses on an implementation on a personal user device, such as a mobile phone or personal audio player, other devices may be configured to perform the process 800 or a variant thereof. For example, tablet devices or laptop computers may be used to aurally present content, receive user communications, and present communications from other group members. The process 800 can be implemented as a software module or collection of modules residing within non-transitory computer storage, such as RAM, ROM, a hard disk, or the like, of a computing device associated with the user device. One or more processors of the computing device can execute the software module.

The process 800 begins at block 802. The process 800 may begin execution when the user device is powered on, or may be executed in response to user-initiation of content playback. At block 804, the user device may synchronize group content positions and interactions. For example, the user device may connect via a wireless network connection with the shared consumption management system 102 and retrieve data regarding the current content positions and communications submitted by other group members.

At block 806, the user device may begin presenting content to the user. The user device may playback audio content from the most recent point at which content consumption was stopped, or from some point in close proximity thereto. While the user device is presenting content to the user, the user device may monitor for certain interactions and data. For example, the user device may monitor for user-initiated actions, such as activation of a button to add commentary. As another example, the user device may detect that a group comment or other input has been associated with the content at the passage, portion, or point that is currently being presented to the user. As a further example, a user may wish to stop content playback and instead access an alternate audio program or stream of group commentary and communication.

At decision block 808, the user device determines whether the user has initiated addition of commentary or some other communication. For example, the user may speak a voice command or press a button on the user device to add a voice annotation or to indicate like/dislike or a score for the content at the current play position. If the user has initiated such an action, the process 800 can proceed to block 814.

At block 814, the user device may record and submit the requested communication. For example, a microphone may be activated for receipt of a voice annotation or initiation of an audio chat. Data regarding the communication (e.g., a recording of the voice annotation) may be transmitted to the shared consumption management system 102, where it may be stored in the comments data store 212 and transmitted to some or all group members.

At decision block 810, the user device determines whether a group comment or other communication has been encountered. For example, a comment may be associated with the content at the current play position, or another group member may transmit a request to initiate a voice chat with the user. If such a communication has been encountered or received, the process 800 may proceed to block 816.

At block 816, the user device may notify the user that such a communication has been encountered or received. For example, the user may be listening to the content, and the user device may not be configured with a visual display. The user device may generate a tone or other aural indication that a communication has been received or encountered so that the user may be alerted without stopping presentation of the content. In some embodiments other notifications may be used, such as vibration. The user may then initiate presentation of the communication by pausing content playback and receiving the communication, or by entering an alternate audio stream of group communications. In some embodiments, the communication may be presented to the user during content playback, such as when presentation of the communication will not substantially interfere with content consumption. For example, when a like/dislike or a score from another group member is encountered, an aural indication of the communication may be played to the user during content consumption.

At decision block 812, the user device determines whether the user desires to pause playback and access an alternate audio stream of group communications. If so, the process 800 can proceed to block 818. At block 818, the alternate audio stream may be presented to the user. The alternate audio stream may include audio representations of text-based comments, commentary, annotations, and other communications submitted by group members. The alternate audio stream may also include audio communications from other group members. In some embodiments an alternate audio stream may correspond to a group voice chat, the voice portion of a video chat, or a text-to-speech representation of a an ongoing text chat. The user may interact wither other group members trough the use of a microphone, in the case of voice or video chats, and through the addition of a speech recognition component in the case of text chats.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for managing a content consumption group, the system comprising:
   a computer-readable memory storing computer-executable instructions; and
   a physical computing device in communication with the computer-readable memory, the physical computing device, when executing the computer-executable instructions, configured to at least:
      receive, from each of a plurality of user devices, a current content position within a content item being consumed by a plurality of users, wherein each user device is associated with a user of the plurality of users, and wherein each of the plurality of users is associated with a user group;
      implement a content position policy submitted by an authorized first user of the user group,
         wherein the content position policy is related to the current content positions of the plurality of users of the user group, and
         wherein individual users, of the plurality of users, associated with current content positions not satisfying the content position policy are prohibited from participating in an activity of the user group;
      receive, from one or more of the plurality of user devices, commentary related to the content item; and
      enable the authorized first user to moderate distribution of the commentary to the user group.

2. The system of claim 1, wherein the current content position received from each of the plurality of devices relates to a play position within the content item, a stop position within the content item, a specific location within the content item, or a portion of the content item.

3. The system of claim 1, wherein the content item comprises an electronic book, an audio book, or a video.

4. The system of claim 1, wherein enabling the first user to moderate distribution of the commentary comprises permitting the first user to perform at least one of the following: modify commentary received from a user device associated with a second user; delete commentary received from a user device associated with a second user; or solicit commentary from a second user.

5. The system of claim 1, wherein the implementing the content position policy submitted by an authorized first user of the user group comprises determining whether at least one of the current content positions of the plurality of users of the user group satisfies the content position policy submitted by the authorized first user of the user group.

6. The system of claim 1, wherein the physical computing device is configured to prohibit the individual users from participating in the activity of the user group by at least prohibiting the individual users from accessing communications from the user group.

7. The system of claim 1, wherein the physical computing device is configured to prohibit the individual users from participating in the activity of the user group by at least prohibiting the individual users from sending communications to the user group.

8. A computer-implemented method for managing group content consumption, the computer-implemented method comprising:
   under control of one or more computing devices configured with specific computer-executable instructions, receiving, from an authorized first user of a plurality of users associated with a user group, a content consumption rule, wherein the content consumption rule relates to current content positions within a content item being consumed by the plurality of users of the user group;

applying the content consumption rule to the current content positions such that individual users, of the plurality of users, associated with current content positions not satisfying the content consumption rule are not permitted to participate in an activity of the user group; and enabling the authorized first user to moderate commentary related to the content item that is received from at least one other user of the user group.

9. The computer-implemented method of claim 8, wherein at least one of the current content positions relates to a play position within the content item, a stop position within a content item, or a portion of the content item.

10. The computer-implemented method of claim 8, wherein the content item comprises an audio book, a musical recording, a video, a video game, or an electronic book.

11. The computer-implemented method of claim 8 wherein prohibiting the individual users from participating in the activity of the user group comprises prohibiting the individual users from submitting communications to the user group.

12. The computer-implemented method of claim 8, wherein the content consumption rule comprises a requirement that a second user of the user group maintains a current content position within a threshold distance from a mean or median current content position of the user group.

13. The computer-implemented method of claim 8, wherein the content consumption rule comprises a requirement that a second user of the user group have a current content position at or ahead of a scheduled content position.

14. The computer-implemented method of claim 8, wherein the content consumption rule comprises a requirement that a second user of the user group have a current content position within a permissible range of a scheduled content position corresponding to a present time.

15. The computer-implemented method of claim 8, wherein the content consumption rule comprises a requirement that a second user of the user group have a current content position that does not exceed a predetermined content position.

16. The computer-implemented method of claim 15, wherein the predetermined content position corresponds to an important plot development of the content item.

17. The computer-implemented method of claim 15, wherein the predetermined content position is provided by the authorized first user.

18. The computer-implemented method of claim 8, wherein one or more users of the user group are not authorized to submit a content consumption rule.

19. The computer-implemented method of claim 8, wherein enabling the first user to moderate comprises permitting the first user to perform at least one of the following: modify commentary received from a second user; delete commentary received from a second user; or solicit content-related commentary from a second user.

20. The computer-implemented method of claim 19, wherein the first user is separate from the second user.

21. The computer-implemented method of claim 8, further comprising receiving, from the authorized first user, content selection data indicating the content item being consumed by the user group.

22. The computer-implemented method of claim 21, wherein the authorized first user is a creator of the content item.

23. The computer-implemented method of claim 8, further comprising enabling the authorized first user to invite a second user to join the user group.

24. The computer-implemented method of claim 8, further comprising enabling the authorized first user to remove a second user from the user group.

25. The computer-implemented method of claim 8, wherein prohibiting the individual users from participating in the activity of the user group comprises prohibiting the individual users from accessing communications from the user group.

26. A non-transitory computer storage medium which stores a computer-executable module, said computer-executable module, when executed by one or more processors, configured to:

receive, from an authorized first user of a plurality of users associated with a user group, group content position data regarding determining whether current content positions within a content item being consumed by the plurality of users associated with the user group are substantially similar, wherein each current content position is associated with a user of the plurality of users;

determine whether two or more content positions are substantially similar according to the group content position data;

in response to determining that a content position is not substantially similar to at least one of the two or more content positions, prohibit a second user associated with the content position from submitting commentary to the user group; and enable the authorized first user to moderate commentary related to the content item that is received from at least one other user of the user group.

27. The non-transitory computer storage medium of claim 26, wherein at least one of the current content positions relates to a play position within the content item, a stop position within a content item, or a portion of the content item.

28. The non-transitory computer storage medium of claim 26, wherein the content item comprises an audio book, a musical recording, a video, a video game, or an electronic book.

29. The non-transitory computer storage medium of claim 26, wherein the group content position data comprises a selection of a predefined content consumption rule.

30. The non-transitory computer storage medium of claim 26, wherein the group content position data comprises a modification to a content consumption rule.

31. The non-transitory computer storage medium of claim 26, wherein the group content position data comprises a new content consumption rule.

32. The non-transitory computer storage medium of claim 26, wherein at least one user of the plurality of users associated with the user group is not permitted to submit group content position data.

33. The non-transitory computer storage medium of claim 26, wherein at least one user of the plurality of users associated with the user group is not permitted to moderate the commentary.

* * * * *